United States Patent
Yamaguchi

(10) Patent No.: US 6,602,571 B2
(45) Date of Patent: Aug. 5, 2003

(54) METHOD FOR MANUFACTURING MAGNETIC ENCODERS AND MAGNETIC ENCODERS MANUFACTURED BY USING SUCH METHOD

(75) Inventor: Yoshihiko Yamaguchi, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,400

(22) Filed: Oct. 24, 2001

(65) Prior Publication Data

US 2002/0078549 A1 Jun. 27, 2002

(30) Foreign Application Priority Data

Oct. 24, 2000 (JP) .......................................... 2000-323399

(51) Int. Cl.$^7$ ........................... B32B 25/02; B32B 25/04; B32B 31/00; B29B 13/08; G01B 7/00
(52) U.S. Cl. ....................... 428/66.6; 428/131; 428/137; 428/220; 428/692; 264/118; 264/153; 264/232; 156/307.1; 156/307.7; 156/308.2; 324/200; 324/207.22
(58) Field of Search ......................... 264/232, 109–128, 264/153; 156/308.2, 307.1, 307.7; 428/66.6, 220, 131, 137, 692; 324/200, 207.22

(56) References Cited

U.S. PATENT DOCUMENTS 3,277,524 A * 10/1966 Silver .......................... 425/174

5,089,817 A 2/1992 Santos et al.
2002/0027192 A1 * 3/2002 Yamaguchi et al. ... 250/231.13

OTHER PUBLICATIONS

Patent Abstracts of Japan, vol. 004, No. 40 (E–004), Mar. 28, 1980 & JP 55 012795 A (Matsushita Electric Ind Co Ltd), Jan. 29, 1980.
Patent Abstracts of Japan, vol. 007, No. 162 (E–187), Jul. 15, 1983 & JP 58 070514 A (Matsushita Denki Sangyo KK), Apr. 27, 1983.
Patent Abstracts of Japan, vol. 015, No. 269 (E–1087), Jul. 9, 1991 & JP 03 089484 A (Yoshimasa Masuda), Apr. 15, 1991.

* cited by examiner

Primary Examiner—Stephen J. Lechert, Jr.
(74) Attorney, Agent, or Firm—Wenderoth, Lind & Ponack, L.L.P.

(57) ABSTRACT

An unvulcanized raw rubber is provided, to which magnetic ferrite powder is added. A resulting mixture composed of the unvulcanized raw rubber and magnetic ferrite powder is passed through a rolling machine or an extruding machine such that the mixture is formed into a sheet blank that contains the magnetic ferrite powder aligned regularly in a particular orientation. Alternatively, the resulting mixture may be first passed through an extruding machine and then through a rolling machine. The sheet blank is then stamped across a planar direction such that a ring-like sheet is formed. The ring-like sheet, along with a supplemental ring, is placed inside a metal mold, where the ring-like sheet and supplemental ring are compressed in an axial direction, while applying heat thereto, so that the ring-like sheet is vulcanized and joined to the supplemental ring. Finally, the vulcanized ring-like sheet is magnetized so that S poles and N poles appear alternately around its circumference.

22 Claims, 3 Drawing Sheets

METHOD FOR MANUFACTURING MAGNETIC ENCODERS AND MAGNETIC ENCODERS MANUFACTURED BY USING SUCH METHOD

BACKGROUND OF THE INVENTION

1. Field of the Invention

The present invention relates to a magnetic encoder and a method for manufacturing such a magnetic encoder, wherein the magnetic encoder may be used in conjunction with a sensor on a semiconductor chip that is placed opposite the magnetic encoder, and is capable of producing codes as represented by a sequence of pulses that are generated by magnetic forces. More particularly, the present invention relates to a magnetic encoder that includes a supplemental or reinforcing ring member and a ring-like magnetic rubber member, wherein the magnetic rubber member is obtained by vulcanizing a raw rubber in its unvulcanized state, and magnetizing the rubber so that the rubber member has S poles and N poles alternately around its circumference. The magnetized rubber member is firmly combined with the supplemental ring member and is uniformly magnetized in its circumferential direction, and accordingly, the magnetic encoder can provide strong magnetic forces. Furthermore, the present invention provides a method for manufacturing such a magnetic encoder.

2. Description of the Prior Art

Conventional magnetic encoders that include a rubber material possessing magnetism have been manufactured by a number of methods, some examples of which are described below.

According to one method, a proper quantity of magnetic ferrite powder is added to a raw rubber material in its unvulcanized state (which may also be referred to as "an unvulcanized raw rubber material"), and the powder and rubber material are mixed together. Then, a resulting mixture is formed into a rubber sheet in an unvulcanized state by performing a sheet rolling process. The unvulcanized raw rubber sheet is then cut into slit-like square strips. Each of the square strips is then joined annularly at opposite ends thereof so that a ring-like rubber blank is formed. The ring-like rubber blank thus obtained is then placed in a cavity in a metal mold, where the rubber blank is compressed, while applying heat thereto, so that the rubber blank is formed into a rubber member having a round circumference. Finally, the rubber member is magnetized so that S poles and N poles appear alternately around its circumference.

According to another method, an unvulcanized raw rubber material that contains a magnetic ferrite powder is extruded into elongated strips by using an extruding machine. Then, each of the strips is temporarily joined annularly at opposite ends thereof so that a ring-like rubber blank is formed. The ring-like rubber blank thus obtained is then placed in a cavity in a metal mold, where the rubber blank is compressed, while applying heat thereto, so that the rubber blank is formed into a rubber member having a round circumference. Finally, the rubber member is magnetized so that S poles and N poles appear alternately around its circumference. This method is widely used since it is expected to enhance moldability and workability.

According to still another method, a raw rubber material that contains a magnetic ferrite powder is rolled into elongated sheets by using a roll machine. A rubber blank having an annular shape is stamped out from each of the sheets by using a shearing machine. The rubber blank having the annular shape is then magnetized so that S poles and N poles appear alternately around its circumference. Finally, the rubber member thus obtained is attached to a supplemental or reinforcing ring by virtue of an adhesive.

The conventional methods that have been mentioned above have respective problems, which will be described below.

In the first method mentioned above, at an initial stage where the magnetic powder, such as ferrite, is added to and mixed with the raw rubber material, it is not considered that the magnetic powder should be aligned regularly in a particular orientation when the rubber material is magnetized. Accordingly, when the rubber material containing such magnetic ferrite powder is magnetized, magnetic forces are produced that are not aligned regularly in a circumferential direction. It is therefore impossible to obtain a magnetic encoder that provides powerful and uniform magnetic forces in the circumferential direction when the encoder becomes magnetized.

In the second method mentioned above, although that part of the magnetic powder, such as ferrite, that exists in a middle portion of the strip may be aligned regularly in a particular orientation, remaining parts of the magnetic powder that exist at joined ends tend to be aligned irregularly in a circumferential direction. Therefore, it is also impossible to obtain a magnetic encoder that provides powerful and uniform magnetic forces in the circumferential direction when the encoder becomes magnetized.

In the third method mentioned above, a rubber ring member that has S poles and N poles alternately around its circumference is attached to a supplemental or reinforcing ring member by virtue of adhesive, after the rubber ring member is magnetized. It is therefore difficult to firmly join the rubber ring member and the supplemental or reinforcing ring member into a single unit.

SUMMARY OF THE INVENTION

In light of the problems of the prior art methods described above, it is therefore one object of the present invention to provide a magnetic encoder that includes a rubber ring member having S poles and N poles alternately arranged in a circumferential direction, and a supplemental or reinforcing ring member, wherein the rubber ring member and the supplemental or reinforcing ring member are firmly joined into a single unit, such that the magnetic encoder provides powerful and uniform magnetic forces in the circumferential direction when the encoder is magnetized.

Another object of the present invention is to provide a method for manufacturing such a magnetic encoder.

According to the method of the present invention, and the magnetic encoder of the present invention obtained by the method, the magnetic encoder may be used with a sensor on a semiconductor sensor chip that is placed opposite the magnetic encoder, and may produce codes as represented by a sequence of pulses generated by magnetic forces. The method, as well as the magnetic encoder obtained by the method, will be described below in some detail by referring to accompanying drawings.

In the method for manufacturing the magnetic encoder in accordance with the present invention, an unvulcanized raw rubber material is first provided, to which material a magnetic ferrite powder is added, and the rubber material and ferrite powder are mixed together. A resulting mixture of the unvulcanized raw rubber material and magnetic ferrite powder is passed through a rolling or extruding machine that forms the mixture into a sheet blank 1 that contains the magnetic ferrite powder aligned regularly in a particular orientation, as shown in FIG. 1. Alternatively, a sheet blank 1 can be produced by extruding the mixture using an extruding machine, then by passing an output of the extruding machine through a rolling machine so as to form the sheet blank 1. In this case, the sheet blank 1 that has been extruded and then passed through the rolling machine may also contain magnetic ferrite powder aligned regularly in a particular orientation.

Next, the sheet blank 1 in either case is stamped across a planar direction. This results in a ring-like sheet blank or annular blank 11 as shown in FIG. 2.

The ring-like sheet blank 11, along with a supplemental or reinforcing ring 4, is placed on a metal mold, specifically between lower and upper halves 2, 12 of the metal mold as shown in FIG. 3. Then, the metal mold is operated to compress the ring-like sheet blank 11 and supplemental ring 4 in an axial or vertical direction while applying heat thereto. This compression provides a vulcanizing action that forms a ring-like rubber member 6 which is a composite annular member including the ring-like sheet blank 11 and supplemental ring 4, which are joined together by the vulcanizing action.

The ring-like rubber member 6 thus obtained may then be magnetized so that S poles and N poles appear alternately around its circumference, as shown in FIG. 4. This results in a magnetic encoder 5 according to the present invention.

In the magnetic encoder 5 obtained according to the method of the present invention, the ring-like rubber member 6, on which S poles and N poles are alternately arranged in a circumferential direction, is attached to the supplemental ring 4 through the vulcanizing action. Thus, the magnetic encoder 5 obtained by the method according to the present invention includes the ring-like rubber member 6, which is vulcanized, and supplemental ring 4 that are joined together more firmly than when two similar members are joined together by using adhesive as in a prior art method.

When a sheet blank 1 is formed according to the method of the present invention, it is very important that the sheet blank 1 is formed so that it can have magnetic ferrite powder aligned regularly in a particular orientation. The reason for this is that if the magnetic ferrite powder contained in the sheet blank 1 is aligned regularly in such a particular orientation as described above, then a magnetic encoder 5 that includes a vulcanized ring-like rubber member 6, derived from such sheet blank 1, can reduce any error in magnetic pitch precision that might otherwise occur, and each of S poles and N poles that are alternately magnetized can provide regular magnetic flux density.

As used in this specification, the term "error in magnetic pitch precision" refers to any error between an actual value and a theoretical value in terms of distance between an N pole and an S pole, when the N pole and the S pole are alternately magnetized in a circumferential direction of the vulcanized ring-like rubber member 6.

By considering the above factors, it is desirable that the sheet blank 1 should be formed from any of the following manners.

When a rolling machine is used to form the sheet blank 1, it is desirable that unvulcanized raw rubber that contains magnetic ferrite powder is passed through a series of rolls so that the rubber is gradually formed into a sheet.

When an extruding machine is used to form the sheet blank 1, it is desirable that the extruding machine has an outlet port having a simple flat configuration.

When an extruding machine is used, the extruding machine may alternatively have an outlet port having a ring-like shape, and may provide a hollow cylindrical shape output. Then, an output of the extruding machine is cut along the length thereof, or in a longitudinal direction. This results in an elongated sheet blank 1.

As an alternative method, it is desirable that unvulcanized raw rubber that contains magnetic ferrite powder is first extruded by a extruding machine having a simple flat outlet configuration, or a circular outlet configuration, so that a flat-like output or a strip-like output may be formed, and this flat-like output or strip-like output is then passed through a rolling machine so that a sheet blank 1 is formed.

In any case, it is desirable that the sheet blank 1 has a thickness of between 0.1 mm and 3.00 mm, and that magnetic ferrite powder contained in the sheet blank 1 is aligned regularly in a particular orientation. In this way, a magnetic encoder 5 that includes vulcanized ring-like rubber member 6, derived from such sheet blank 1, can reduce any error in magnetic pitch precision that might otherwise occur, and has S poles and N poles each of which provides a regular magnetic flux density when these poles are alternately magnetized around a circumference of the ring-like rubber member.

It should be noted that the sheet blank 1, which contains the magnetic ferrite powder that is aligned regularly in the particular orientation, may desirably have a thickness of between 0.1 mm and 1.00 mm. In this case, error in magnetic pitch precision can be further reduced, and magnetic flux density of each of the S and N poles alternately magnetized can become more regular.

If it is requested to obtain a desired thickness, several sheet blanks 1, each of which has a thickness of between 0.1 mm and 3.00 mm, or preferably between 0.1 mm and 1.00 mm, may be stacked one on another. Thereby, the desired thickness can be obtained.

In order to measure any error in magnetic pitch precision, a magnetic encoder 5 that is obtained as described above is tentatively placed opposite a sensor on a semiconductor sensor chip 7 by setting a gap 8, between the encoder and sensor chip, to each of values that range between 0.5 mm and 3.00 mm, as shown in FIG. 5. In each case, it was found that an error that occurred represented less than 1.5% of all measurements made. It was also found that each of the S and N poles provided regular magnetic flux density.

It is understood from the foregoing description that any of the methods described above comprise the steps of: forming a raw rubber blank in an unvulcanized state, and containing magnetic ferrite powder, into a sheet blank 1 so that the sheet blank has a thickness of between 0.1 mm and 3.00 mm, preferably between 0.1 mm and 1.00 mm, and also has the magnetic ferrite powder aligned regularly in a particular orientation; stamping the sheet blank 1 across a planar direction into a ring-like blank or annular blank 11 without disturbing alignment of the magnetic ferrite powder as already established; and compressing the ring-like blank 11 in an axial or vertical direction, while applying heat thereto, so that the magnetic ferrite powder flows in the planar direction, thereby causing the magnetic ferrite powder to be aligned more regularly. These steps may interact with each other so that obtained is a magnetic encoder in which any error in magnetic pitch precision is reduced, and which has S poles and N poles each providing a regular magnetic flux density.

Thus, a magnetic encoder 5 manufactured by performing the above steps may be used in any application that requires magnetic pitch precision error to be limited to less than 1.5%, when the magnetic encoder is spaced apart from a sensor on a semiconductor sensor chip 7 with a gap 8 of 0.5 mm to 3.00 mm between the encoder and sensor chip, as shown in FIG. 5.

The magnetic encoder 5 manufactured by performing the above steps may also be used in any application that requires the sensor to provide analog output, since the magnetic encoder 5 can limit magnetic pitch precision error to less than 1.5%, and can reduce any irregular magnetic flux density for each of S and N poles when these poles become alternately magnetized in a circumferential direction.

In summary, vulcanized ring-like rubber member 6 may be obtained by vulcanizing a ring-like blank or annular blank 11 that contains magnetic ferrite powder aligned regularly in a particular orientation, such that in the vulcanized ring-like member 6 there is little irregularity in alignment of the magnetic ferrite powder. Thereby, after the vulcanized ring-like rubber member 6 is magnetized, and S poles and N poles alternately appear around a circumference of the rubber member, as shown in FIG. 4, a magnetic encoder 5 is obtained which provides powerful magnetic forces while reducing irregularity of magnetic forces in a circumferential direction.

The method according to the present invention allows magnetic ferrite powder contained in unvulcanized raw rubber to remain aligned regularly in a circumferential direction from a time when the unvulcanized raw rubber is formed into a ring-like rubber blank or annular blank 11 until a time when the rubber blank is joined to a supplemental ring 4 during a subsequent vulcanizing process. When the ring-like rubber member 6 thus obtained is then magnetized so that S poles and N poles appear alternately around a circumference of the rubber member, provided are powerful and uniform magnetic forces at any circumferential point. Thus, a magnetic encoder 5 including such a ring-like rubber member 6 can perform very well.

Because the ring-like rubber blank 11 is joined to the supplemental ring 4 during the vulcanizing process, the rubber blank and supplemental ring are joined together more firmly into a single unit.

DETAILED DESCRIPTION OF PREFERRED EMBODIMENTS

Several preferred embodiments of the present invention are now described by reference to the accompanying drawings.

In one embodiment, a raw rubber in its unvulcanized state, or an unvulcanized raw rubber, is first provided. This unvulcanized raw rubber contains a mixture that may be composed of any one of polymers known in the art, such as NBR (acrylonitrile butadiene rubber), ACM (acrylic acid estercopolymer) and H-NBR (hydrogen added acrylonitrile butadiene rubber), magnetic ferrite powder, and any one of rubber agents known in the art. The magnetic ferrite powder may have a composition ratio that preferably ranges between 70% and 98% by weight relative to the other components. If the composition ratio of the magnetic ferrite powder is less than 70%, magnetic forces that may be provided by the final product, or a magnetic encoder manufactured according to any of the methods of the present invention, will be undesirably insufficient. Conversely, if this composition ratio is more than 98%, the unvulcanized raw rubber will become too hard, which might undesirably affect moldability or workability during a subsequent molding process.

Examples of the magnetic ferrite powder may include strontium ferrite powder, barium ferrite powder, and a combination of strontium ferrite powder and barium ferrite powder. Which of these different ferrite powders should be chosen may be determined, depending upon particular requirements of a magnetic encoder being manufactured, such as performance thereof and the like.

Figure 1:
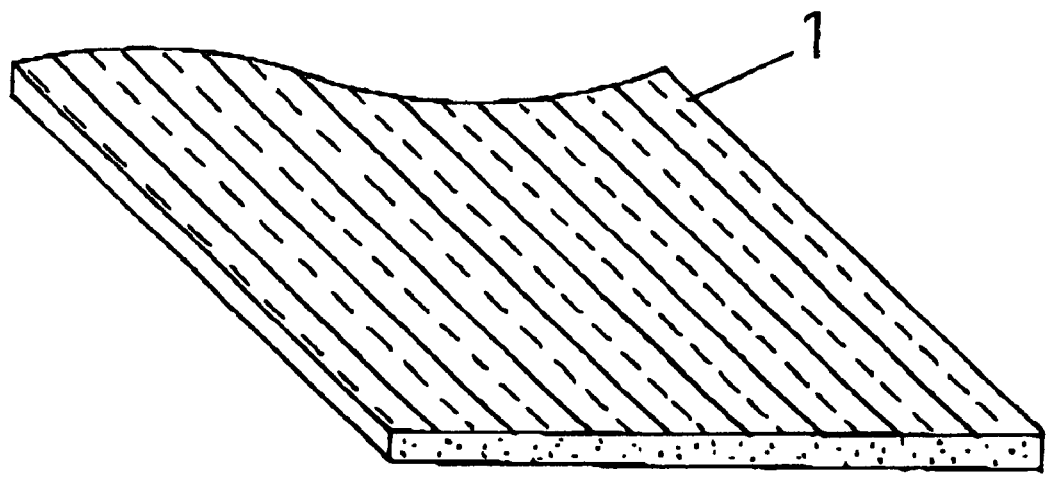
FIG. 1 is a perspective view illustrating a formed sheet blank in accordance with one method of the present invention.

The unvulcanized raw rubber thus obtained is passed through a conventional roll machine, where the unvulcanized raw rubber is formed into a sheet blank 1 having a 2 mm thickness and containing the magnetic ferrite powder aligned regularly in a particular orientation, as shown in FIG. 1.

Figure 2:
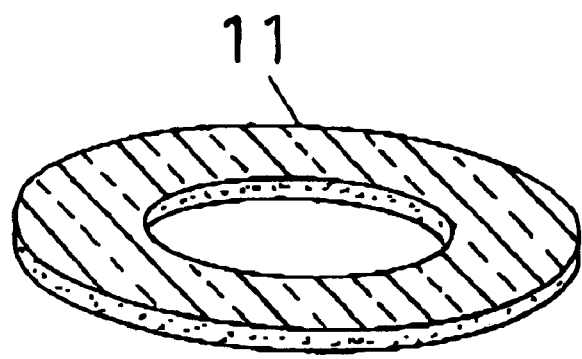
FIG. 2 is a perspective view illustrating a formed ring-like rubber blank in accordance with the one method of the present invention.

Then, the sheet blank 1 is stamped across a planar direction, specifically in a vertical direction of FIG. 1, so as to produce a ring-like blank or annular blank 11 as shown in FIG. 2.

A physical size and dimensions of the ring-like blank 11 may be determined, depending upon particular requirements for a size and dimensions of a final product or magnetic encoder.

The stamping of the sheet blank 1 to be formed into the ring-like blank 11 may be performed by using a stamping die, cutter, press, and the like.

It should be noted, however, that the stamping or cutting should desirably occur across the plane of the sheet blank 1 in order to provide a sharp cut face, without disturbing alignment or orientation of the magnetic ferrite powder that has previously been established in the sheet blank 1.

The ring-like blank 11 may be provided by stacking several sheet blanks one on another so that a stack having a desired thickness is provided, which stack is then stamped (not shown).

Figure 3:
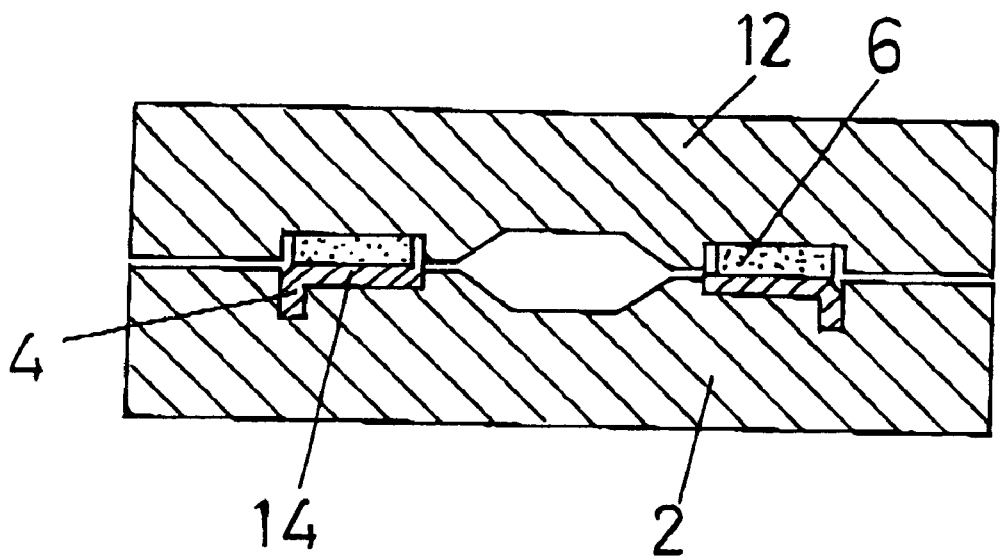
FIG. 3 is a sectional view illustrating how a ring-like blank and a supplemental ring, which are placed inside a metal mold, are joined together during a vulcanizing process in accordance with the one method of the present invention.

Next, the ring-like blank 11, with a supplemental ring 4 placed therebeneath, is placed inside a metal mold, specifically between lower and upper molds 2, 12 of the metal mold, in which the ring-like blank 11 is compressed in an axial direction, or in a vertical direction of FIG. 3, while applying heat. During this compression, the ring-like blank 11 is vulcanized, and is firmly joined with the supplemental ring 4 into a single unit or composite annular member.

The compression may occur while applying heat of between 150° C. and 230° C., and while applying pressure of between 1 MPa and 200 MPa.

Figure 5:
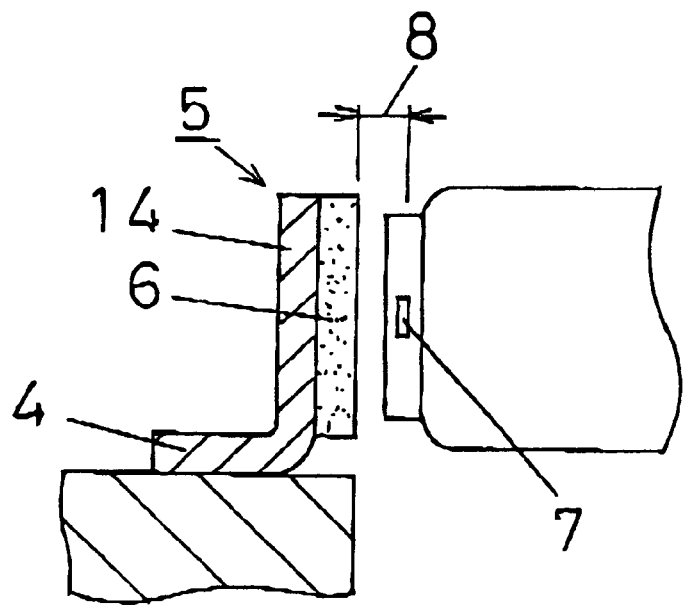
FIG. 5 is a sectional view illustrating how the magnetic encoder manufactured in accordance with the one method of the present invention is placed opposite a sensor on a semiconductor sensor chip, with some parts not shown.
Figure 6:
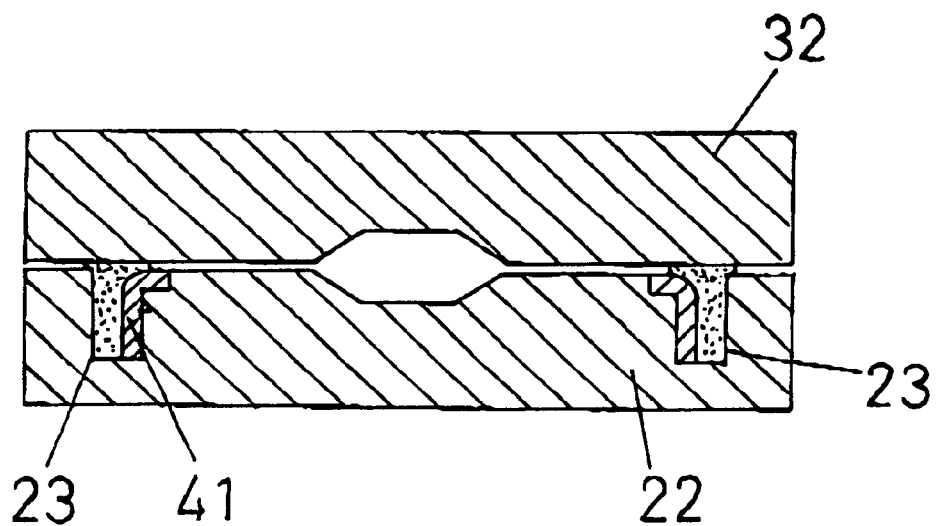
FIG. 6 is a sectional view illustrating how a ring-like rubber blank and a supplemental ring, which are placed inside a metal mold, are joined together during a vulcanizing process in accordance with an alternative method of the present invention.

The supplemental ring 4 may have a flange 14 as shown in FIGS. 3 and 5. In this case, the ring-like blank 11 may be joined with the supplemental ring 4 along a plane of the supplemental ring. Alternatively, a supplemental ring 41 that may have a cylindrical portion as shown in FIG. 6 may be used. In this case, the ring-like blank 11 may be joined with the supplemental ring 41 along the cylindrical portion of the supplemental ring.

Generally, each of the supplemental rings 4, 41 is made of metal, and may be used to increase mechanical strength of the magnetic encoder.

When the supplemental ring 4 having the flange 14 as shown in FIGS. 3 and 5 is used, the metal mold including the lower and upper molds 2, 12 as shown in FIG. 3 may be used to join the ring-like blank 11 to the supplemental ring 4 by compressing the ring-like blank and supplemental ring in an axial direction or vertical direction while applying heat thereto. During such compression, magnetic ferrite powder that has previously been aligned regularly in the ring-like blank 11 may flow in a planar direction, thus permitting the magnetic ferrite powder to be aligned or oriented more regularly.

When the supplemental ring 41 having the cylindrical portion as shown in FIG. 6 is used, a metal mold that includes a lower mold 22 having a deep cavity 23, and an upper mold 32, as shown in FIG. 6 may be used. When this metal mold is used to join the ring-like blank 11 with the supplemental ring 41 along the cylindrical portion of the supplemental ring, magnetic ferrite powder that has previously been aligned regularly in the ring-like blank 11 may fill the deep cavity 23 without disturbing established alignment or orientation of the powder.

Figure 4:
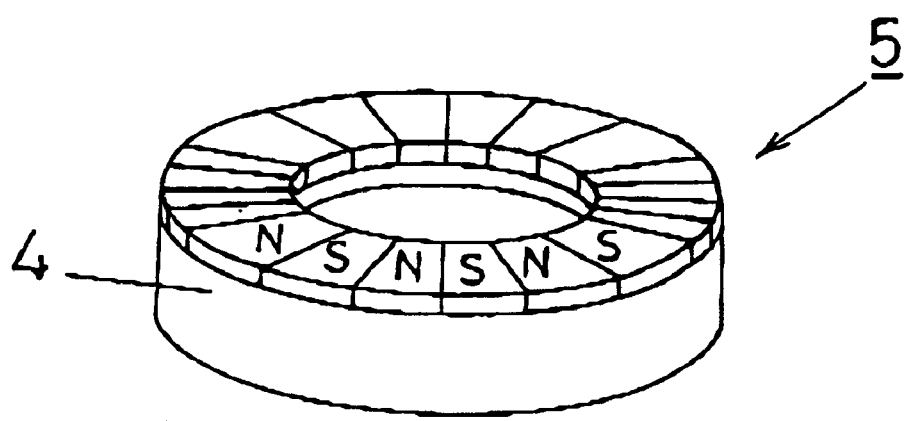
FIG. 4 is a perspective view illustrating a magnetic encoder manufactured in accordance with the one method of the present invention.

A ring-like rubber member or composite annular member 6 thus obtained is magnetized so that N poles and S poles appear alternately around a circumference of this rubber member, as shown in FIG. 4. In this way, a magnetic encoder 5 is obtained.

Comparison Between the Inventive and Non-Inventive Magnetic Encoders

The following presents results that have been obtained by comparing the inventive magnetic encoder with a non-inventive magnetic encoder.

Samples of the inventive magnetic encoder 5 manufactured according to the method of the present invention described above are provided, which are referred to as "the inventive samples". To compare with the inventive samples, samples of the non-inventive magnetic encoder manufactured according to a typical prior art method are provided, which are referred to as "the non-inventive samples". The non-inventive samples are manufactured as follows. An unvulcanized raw rubber that includes the same components as that for the inventive samples is used. Then, the unvulcanized raw rubber is extruded by an extruding machine to be formed into an elongated strip shape, which is then temporarily joined at opposite ends thereof to form a ring-like shape. This ring-like shape is placed in a cavity in a metal mold, where it is compressed, while applying heat thereto, into a ring. Finally, this ring is magnetized so that S poles and N poles appear alternately around a circumference of the ring.

For both the inventive and non-inventive samples, compression occurred under the same conditions, e.g. while applying heat of 190° C. and while applying pressure of 10 MPa. Conditions under which magnetic forces were supplied for magnetization of the ring were the same for both the inventive and non-inventive samples.

In order to measure any error in magnetic pitch precision for both the inventive and non-inventive samples, all samples of the respective magnetic encoders were placed opposite a sensor 7 on a semiconductor sensor chip, with a spacing or gap 8 of 2 mm therebetween, as shown in FIG. 5. The following table below shows results.

| | Magnetic Pitch Precision Error (%) | | |
| --- | --- | --- | --- |
| | Average Value ($\mu$) | $3\sigma$ | $\mu + 3\sigma$ |
| Non-inventive samples | 0.73 | 1.08 | 1.81 |
| Inventive samples | 0.36 | 0.29 | 0.65 |

In the table, $\sigma$ represents a standard deviation.

It is seen from the above results that for the inventive samples, 99.7% of all samples have an error range of within $\mu+3\sigma=0.65\%$, which represents half the error that occurred for the non-inventive samples.

Although the present invention has been described with reference to the preferred embodiments by referring to the drawings, it should be understood that all of the constructions, forms or shapes, and positional relationships that have been presented simply provide a conceptual basis to enable those skilled in the art to understand the present invention. It should also be understood that specific values and material compositions that have been presented are simply given by way of example. Therefore, the present invention should not be limited to the particular embodiments described above, and various changes and modifications may be made within the scope and spirit of the invention as defined in the appended claims.

What is claimed is:

1. A method for manufacturing a magnetic encoder for use with a sensor on a semiconductor chip that is placed opposite the magnetic encoder, and for producing codes as represented by a sequence of pulses generated by magnetic forces, said method comprising:

providing an unvulcanized raw rubber;

providing a magnetic ferrite powder;

adding said magnetic ferrite powder to said unvulcanized raw rubber, thereby providing a mixture of said magnetic ferrite powder and said unvulcanized raw rubber;

forming said mixture of said magnetic ferrite powder and said unvulcanized raw rubber into a sheet blank that contains said magnetic ferrite powder aligned regularly in a particular orientation;

removing an annular blank from said sheet blank;

associating said annular blank and a supplemental ring with one another and then applying compressive forces and heat to said annular blank and said supplemental ring, thereby vulcanizing the rubber of said annular blank and joining said annular blank to said supplemental ring so as to provide a composite annular member; and magnetizing said composite annular member such that S poles and N poles are alternately arranged around a circumference of said composite annular member.

2. The method according to claim 1, wherein said magnetic ferrite powder is selected from the group consisting of strontium ferrite powder, barium ferrite powder, and a combination of strontium ferrite powder and barium ferrite powder.

3. The method according to claim 2, wherein forming said mixture into a sheet blank comprises one of (i) passing said mixture through a rolling machine,
(ii) passing said mixture through an extruding machine, and
(iii) passing said mixture through an extruding machine and then passing said mixture through a rolling machine.

4. The method according to claim 3, wherein
removing an annular blank from said sheet blank comprises stamping said sheet blank across a planar surface thereof.

5. The method according to claim 4, wherein
associating said annular blank and a supplemental ring with one another and then applying compressive forces and heat to said annular blank and said supplemental ring comprises placing said annular blank and said supplemental ring in a metal mold and then operating said metal mold.

6. The method according to claim 5, wherein
forming said mixture into a sheet blank comprises forming said mixture into a sheet blank having a thickness of between 0.1 mm and 3.0 mm.

7. A magnetic encoder manufactured according to the method of claim 6, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

8. A magnetic encoder manufactured according to the method of claim 5, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

9. The method according to claim 1, wherein
forming said mixture into a sheet blank comprises forming said mixture into a sheet blank having a thickness of between 0.1 mm and 3.0 mm.

10. A magnetic encoder manufactured according to the method of claim 9, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

11. A magnetic encoder manufactured according to the method of claim 1, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

12. A method for manufacturing a magnetic encoder for use with a sensor on a semiconductor chip that is placed opposite the magnetic encoder, for use in applications that require analog output, and for producing codes as represented by a sequence of pulses generated by magnetic forces, said method comprising:
providing an unvulcanized raw rubber;
providing a magnetic ferrite powder;
adding said magnetic ferrite powder to said unvulcanized raw rubber, thereby providing a mixture of said magnetic ferrite powder and said unvulcanized raw rubber;
forming said mixture of said magnetic ferrite powder and said unvulcanized raw rubber into a sheet blank that contains said magnetic ferrite powder aligned regularly in a particular orientation;
removing an annular blank from said sheet blank;
associating said annular blank and a supplemental ring with one another and then applying compressive forces and heat to said annular blank and said supplemental ring, thereby vulcanizing the rubber of said annular blank and joining said annular blank to said supplemental ring so as to provide a composite annular member; and
magnetizing said composite annular member such that S poles and N poles are alternately arranged around a circumference of said composite annular member.

13. The method according to claim 12, wherein
said magnetic ferrite powder is selected from the group consisting of strontium ferrite powder, barium ferrite powder, and a combination of strontium ferrite powder and barium ferrite powder.

14. The method according to claim 13, wherein
forming said mixture into a sheet blank comprises one of
(i) passing said mixture through a rolling machine,
(ii) passing said mixture through an extruding machine, and
(iii) passing said mixture through an extruding machine and then passing said mixture through a rolling machine.

15. The method according to claim 14, wherein
removing an annular blank from said sheet blank comprises stamping said sheet blank across a planar surface thereof.

16. The method according to claim 15, wherein
associating said annular blank and a supplemental ring with one another and then applying compressive forces and heat to said annular blank and said supplemental ring comprises placing said annular blank and said supplemental ring in a metal mold and then operating said metal mold.

17. The method according to claim 16, wherein
forming said mixture into a sheet blank comprises forming said mixture into a sheet blank having a thickness of between 0.1 mm and 3.0 mm.

18. A magnetic encoder manufactured according to the method of claim 17, wherein
said magnetic encoder has a magnetic pitch precision error of less than 1.5% when said magnetic encoder is placed opposite the sensor on the semiconductor chip and a spacing between the sensor-and said magnetic encoder is between 0.5 mm and 3.0 mm.

19. A magnetic encoder manufactured according to the method of claim 16, wherein
said magnetic encoder has a magnetic pitch precision error of less than 1.5% wherein said magnetic encoder is placed opposite the sensor on the semiconductor chip and a spacing between the sensor and said magnetic encoder is between 0.5 mm and 3.0 mm.

20. The method according to claim 12, wherein
forming said mixture into a sheet blank comprises forming said mixture into a sheet blank having a thickness of between 0.1 mm and 3.0 mm.

21. A magnetic encoder manufactured according to the method of claim 20, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

22. A magnetic encoder manufactured according to the method of claim 12, wherein
said magnetic encoder has a magnetic pitch precision error of less than 1.5% when said magnetic encoder is placed opposite the sensor on the semiconductor chip and a spacing between the sensor and said magnetic encoder is between 0.5 mm and 3.0 mm.

* * * * *